(12) United States Patent
Han et al.

(10) Patent No.: US 8,989,441 B2
(45) Date of Patent: Mar. 24, 2015

(54) DATA ACQUISITION METHOD AND DEVICE FOR MOTION RECOGNITION, MOTION RECOGNITION SYSTEM AND COMPUTER READABLE STORAGE MEDIUM

(71) Applicant: Zheng Han, Beijing (CN)

(72) Inventors: Zheng Han, Beijing (CN); Xiaowei Dai, Beijing (CN); Mi Chen, Beijing (CN)

(73) Assignee: Zepp Labs, Inc., Los Gatos, CA (US)

( * ) Notice: Subject to any disclaimer, the term of this patent is extended or adjusted under 35 U.S.C. 154(b) by 152 days.

(21) Appl. No.: 13/846,700

(22) Filed: Mar. 18, 2013

(65) Prior Publication Data

US 2014/0219498 A1 Aug. 7, 2014

(30) Foreign Application Priority Data

Feb. 7, 2013 (CN) .......................... 2013 1 0049750

(51) Int. Cl.
 *G06K 9/00* (2006.01)
 *G06T 7/20* (2006.01)
(52) U.S. Cl.
 CPC ........................................ *G06T 7/20* (2013.01)
 USPC .......................................................... 382/103
(58) Field of Classification Search
 USPC .......................................... 382/103, 181–231
 See application file for complete search history.

(56) References Cited

U.S. PATENT DOCUMENTS 6,289,124 B1 * 9/2001 Okamoto ....................... 382/187
2005/0259739 A1 * 11/2005 Nakamura et al. ........ 375/240.16

FOREIGN PATENT DOCUMENTS

| CN | 102221369 A | 10/2011 |
| CN | 102591445 A | 7/2012 |
| WO | 2011/003218 | 1/2011 |

OTHER PUBLICATIONS

Office action dated Jun. 19, 2014 from corresponding Chinese Patent Application No. 201310049750.3 and its machine translated English summary by ABBYY PDF Transformer and Google Translate.

* cited by examiner

*Primary Examiner* — Alex Liew
(74) *Attorney, Agent, or Firm* — Ladas & Parry, LLP

(57) ABSTRACT

A data acquisition method and device for motion recognition, a motion recognition system and a computer readable storage medium are disclosed. The data acquisition device for motion recognition comprises: an initial motion recognition module adapted to perform an initial recognition with respect to motion data collected by a sensor and provide motion data describing a predefined range around a motion trigger point to a data storage module for storage; a data storage module adapted to store motion data provided from the initial motion recognition module; and a communications module adapted to forward the motion data stored in the data storage module to a motion computing device for motion recognition. The present invention makes an initial selection to the motion data to be transmitted to the motion computing device under the same sampling rate. Consequently, the present invention reduces pressures on wireless channel transmission and wireless power consumption, and provides high accuracy in motion recognition while providing motion data at the same sampling rate.

18 Claims, 6 Drawing Sheets

| | | |
|---|---|---|
| 0 | Acc X (LSB) | Acc X (MSB) | 1
| 2 | Acc Y (LSB) | Acc Y (MSB) | 3
| 4 | Acc Z (LSB) | Acc Z (MSB) | 5
| 6 | Gyro X (LSB) | Gyro X (MSB) | 7
| 8 | Gyro Y (LSB) | Gyro Y (MSB) | 9
| 10 | Gyro Z (LSB) | Gyro Z (MSB) | 11
| 12 | Mag X (LSB) | Mag X (MSB) | 13
| 14 | Mag Y (LSB) | Mag Y (MSB) | 15
| 16 | Mag Z (LSB) | Mag Z (MSB) | 17

FIG. 4a

| | | |
|---|---|---|
| 0 | Acc X (LSB) | Acc X (MSB) | 1
| 2 | Acc Y (LSB) | Acc Y (MSB) | 3
| 4 | Acc Z (LSB) | Acc Z (MSB) | 5
| 6 | Gyro X (LSB) | Gyro X (MSB) | 7
| 8 | Gyro Y (LSB) | Gyro Y (MSB) | 9
| 10 | Gyro Z (LSB) | Gyro Z (MSB) | 11
| 12 | Acc high X (LSB) | Acc high X (MSB) | 13
| 14 | Acc high Y (LSB) | Acc high Y (MSB) | 15
| 16 | Acc high Z (LSB) | Acc high Z (MSB) | 17
| 18 | Mag X (LSB) | Mag X (MSB) | 19
| 20 | Mag Y (LSB) | Mag Y (MSB) | 21
| 22 | Mag Z (LSB) | Mag Z (MSB) | 23

DATA ACQUISITION METHOD AND DEVICE FOR MOTION RECOGNITION, MOTION RECOGNITION SYSTEM AND COMPUTER READABLE STORAGE MEDIUM

CROSS-REFERENCE TO RELATED APPLICATION

This application claims priority from Chinese Patent Application No. 201310049750.3 filed on Feb. 7, 2013, the disclosure of which is hereby incorporated by reference in its entirety.

TECHNICAL FIELD

The present invention relates to the technical field of computer applications, and more particularly to a data acquisition method and device for motion recognition, a motion recognition system and a computer readable storage medium.

BACKGROUND TECHNOLOGY

With the continued development in computer application technology, motion recognition has been widely used in industries such as sports, games, movies, medical simulation and motion and skill training, etc. For example, when a user is playing, for example, golf or badminton, a data acquisition device comprising a sensor may be configured in a club or glove to capture the motion data and send the captured motion data to a motion computing device, which may be disposed in an intelligent terminal including a mobile phone and a tablet computer. After computation and analysis with respect to the motion data from the data acquisition device, the motion computing device may obtain data regarding the position and posture while the user is playing to allow the user to share data or acquire motion training, etc.

One of the conventional motion recognition systems is shown in FIG. 1, which includes a data acquisition device and a motion computing device, as introduced above. The data acquisition device mainly comprises a sensor and a communications module. The motion data collected at the sensor is transmitted in real time to the motion computing device via the communications module. The sensor mentioned herein includes, but is not limited to, an acceleration sensor, gyroscope, and a magnetic field sensor, etc.

As is known, the data acquisition device and the motion computing device generally communicate motion data in real time over a wireless channel, and the motion computing device uses acceleration-based integral algorithms to compute the motion. Consequently, when subjected to the same amount of noises, the higher the sampling rate, the more accurate the computed position and posture data. Nonetheless, in the case of a high sampling rate, the huge amount of data collected by the sensor will exert too much pressure on the transmission over the wireless channel. This not only results in large wireless power consumption, but also goes beyond the maximum capacity of the wireless channel.

BRIEF DESCRIPTION OF THE INVENTION

In view of the above, the present invention provides a data acquisition method and device for motion recognition, a motion recognition system and a computer readable storage medium, which provides high accuracy in motion recognition and reduces wireless power consumption under the same sampling rate.

In particular, the present invention discloses:

a data acquisition method for motion recognition for use in a data acquisition device comprising an initial motion recognition module, a data storage module and a communications module, the method comprising: Step S1) the initial motion recognition module performing an initial recognition with respect to motion data acquired by a sensor, and providing motion data describing a predefined range around a motion trigger point to the data storage module for storage; and Step S2) the communications module forwarding the motion data stored at the data storage module to a motion computing device for motion recognition;

a data acquisition device for motion recognition, comprising: an initial motion recognition module adapted to perform an initial recognition with respect to motion data collected by a sensor and provide motion data describing a predefined range around a motion trigger point to a data storage module for storage; a data storage module adapted to store motion data provided from the initial motion recognition module; and a communications module adapted to transmit the motion data stored in the data storage module to a motion computing device for motion recognition;

a motion recognition system, comprising: a motion computing device; and the aforesaid data acquisition device, wherein the motion computing device is adapted to perform motion recognition based on motion data transmitted from the data acquisition device; and a computer readable storage medium, which stores programs for executing the aforesaid data acquisition method for motion recognition.

It can be seen from the aforesaid technical solutions that the data acquisition device of the present disclosure is provided with an initial motion recognition module and a data storage module. The initial motion recognition module performs an initial recognition on the motion data collected by the sensor, and the data storage module only maintains the part of data describing a predefined range around a motion trigger point, which is of significance to the motion recognition, and transmits this part of data to the motion computing device. As a result, an initial selection is made to the motion data to be transmitted to the motion computing device under the same sampling rate. Consequently, the present invention reduces pressures on the wireless channel transmission and power consumption, and provides high accuracy in motion recognition while providing motion data at the same sampling rate.

BRIEF DESCRIPTION OF THE DRAWINGS

FIG. 4a illustrates a data frame format according to a first embodiment of the present disclosure.

FIG. 4b illustrates another data frame format according to a first embodiment of the present disclosure.

DETAILED DESCRIPTION OF THE INVENTION

The objects, technical solutions and merits of the present invention will be more apparent from the following detailed embodiments with reference to the drawings.

The significance of the present invention resides in introducing an initial motion recognition module and a data storage module into a data acquisition device. Thereby, the data acquisition device is capable of initial selection and buffer of the motion data, excluding data which describes a static status and is insignificant to the motion recognition. Subsequently, the data acquisition device transports the buffered motion data voluntarily or in response to a request to a motion computing device for particular motion recognition. Here under the present invention is introduced in details by way of particular embodiments.

Embodiment 1

Figure 1:
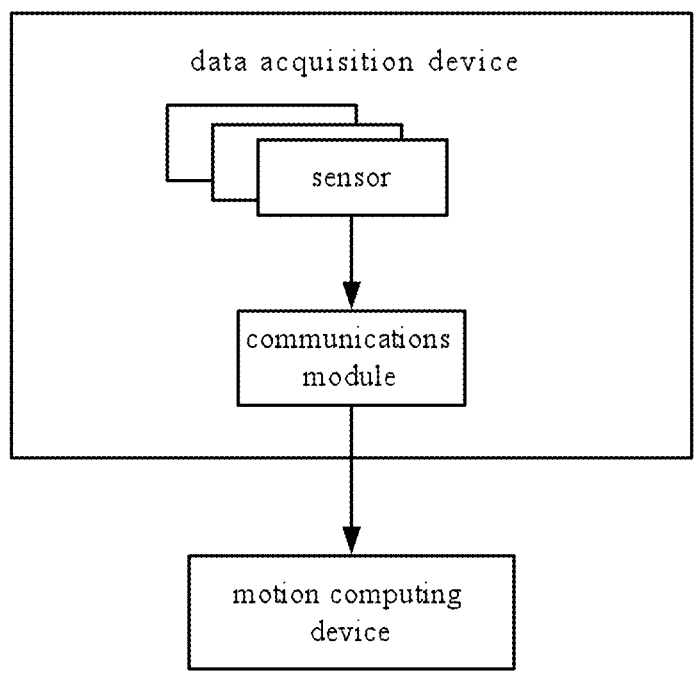
FIG. 1 illustrates a conventional motion recognition system.
Figure 2:
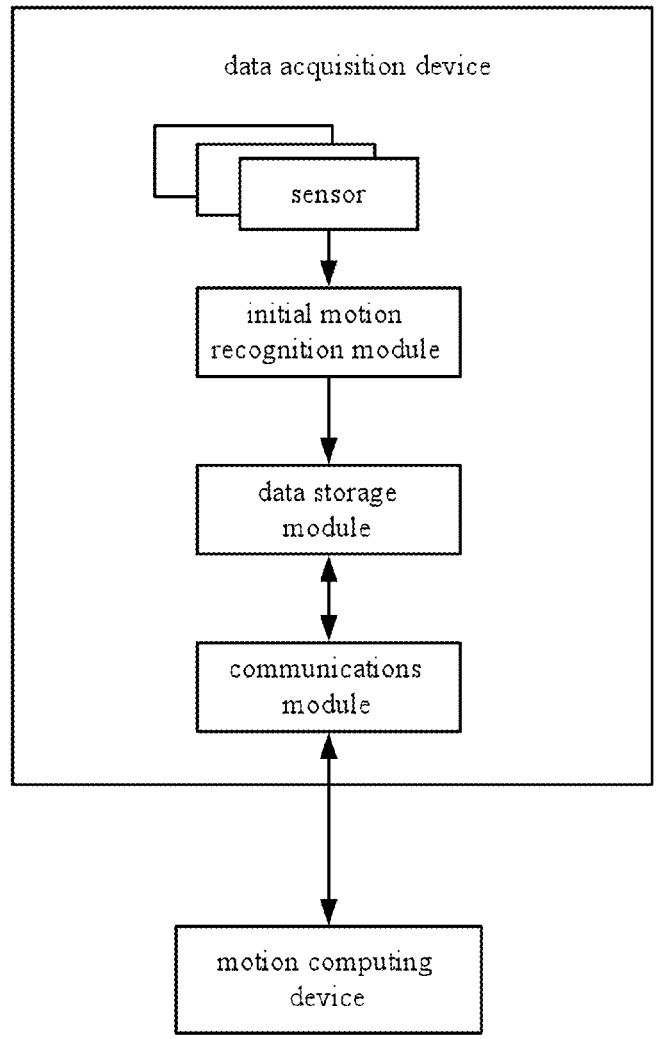
FIG. 2 illustrates a system according to a first embodiment of the present disclosure.

FIG. 2 illustrates a system in accordance with a first embodiment of the present invention. Similarly, the system also comprises a data acquisition device and a motion computing device. However, unlike the conventional systems, the present system includes not only a sensor and a communications module within the data acquisition device, but also an initial motion recognition module and a data storage module. The connections therebetween are as shown in FIG. 2. The data acquisition device may be configured in, but not limited to, a recognizable object such as a club, a bat and glove to collect motion data related to the object to be recognized. The motion computing device may be disposed on, but is not limited to, an intelligent terminal such as a mobile phone, a tablet computer, and PDA. Preferably, the data acquisition device and the motion computing device communicate data via a wireless channel, for example, WIFI, NFC (Near Field Communications), Infrared, and Bluetooth, etc. Of course, they may also communicate data via a wired network.

Similarly, the sensor included in the data acquisition device is adapted to collect motion data related to the object to be recognized. The motion data may include data describing the object being static, and data describing the object in movement. The sensor may be implemented as, but is not limited to, an acceleration sensor, a gyroscope, a magnetic field sensor, and a compass, etc. For example, the sensor may be a group of sensors consisting of a three-axis acceleration sensor, a three-axis gyroscope, and a three-axis magnetic field sensor. The motion data may comprise acceleration, an angular speed and an attitude angle relative to a three-dimensional geomagnetic coordinate system of the object to be recognized.

The initial motion recognition module is configured to perform an initial recognition with respect to the motion data collected by the sensor, and provide the motion data describing a predefined range around a motion trigger point to the data storage module, which then stores the motion data transmitted from the initial motion recognition module.

Figure 3:
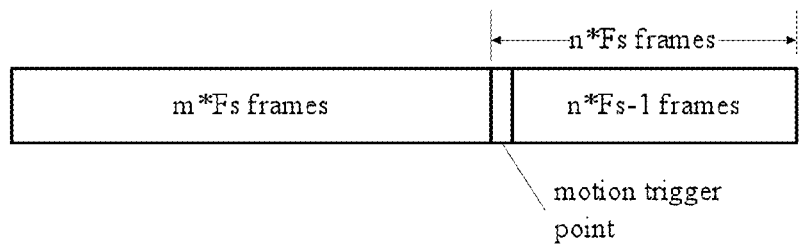
FIG. 3 illustrates a set of motion data stored in the data storage module included in the system according to the first embodiment of the present disclosure.

The main purpose of the initial recognition conducted by the initial motion recognition module is to detect motion, to be more specific, to initially detect a motion trigger point. As the motion computing device will then particularly and accurately analyze and compute the motion data transmitted from the data acquisition device, the initial motion recognition module within the data acquisition device is not required to perform accurate initial motion recognition, but instead rough initial motion recognition. Considering that the motion computing device demands data prior to the start of the motion in the subsequent analysis and computation, the initial motion recognition module is required to provide not only the motion data after the motion trigger point (including the motion trigger point per se) to the data storage module, but also the data before the motion trigger point. That is, the initial motion recognition module needs to provide m*Fs frames of motion data before the motion trigger point, the motion data regarding the motion trigger point per se, and n*Fs−1 frames of motion data after the motion trigger point, wherein m and n are a predefined positive integer, and Fs is a sampling rate. These frames of data constitute one set of motion data. One of such sets of motion data stored in the data storage module is illustrated in FIG. 3

"One frame of motion data" referred to in this embodiment refers to a collection of sampling data collected by various sensors within the same sampling moment. For example, if the sensor comprises a three-axis acceleration sensor, a three-axis gyroscope, and a three-axis magnetic field sensor, said "one frame of motion data" will include {Acc X, Acc Y, Acc Z; Gyro X, Gyro Y, Gyro Z; and Mag X, Mag Y, Mag Z}, wherein Acc X, Acc Y, Acc Z respectively represent the accelerations along Axis X, Y and Z collected by the three-axis acceleration sensor; Gyro X, Gyro Y, Gyro Z respectively represent the angular speeds rotated around Axis X, Y and Z collected by the gyroscope; and Mag X, Mag Y, and Mag Z respectively represent the magnetic field strengths along Axis X, Y and Z collected by the three-axis magnetic field sensor. In the case of a Little-endian storage format (i.e., a high byte is stored at a high address), the frame format of the stored data may be as shown in FIG. 4, wherein LSB is the least significant bit, and MSB is the most significant bit.

Another example may comprise a three-axis acceleration sensor, a three-axis gyroscope, a high G acceleration sensor and a three-axis magnetic field sensor. In this case, the one frame of motion data will be {Acc X, Acc Y, Acc Z; Gyro X, Gyro Y, Gyro Z; Acc high X, Acc high Y, Acc high Z; Mag X, Mag Y, Mag Z}. Acc X, Acc Y, Acc Z respectively represent the accelerations along Axis X, Y and Z collected by the three-axis acceleration sensor; Gyro X, Gyro Y, Gyro Z respectively represent the angular speeds rotated around Axis X, Y and Z collected by the gyroscope; Acc high X, Acc high Y, Acc high Z respectively represent the accelerations along Axis X, Y and Z collected by the high G acceleration sensor; and Mag X, Mag Y, and Mag Z respectively represent the magnetic field strengths along Axis X, Y and Z collected by the three-axis magnetic field sensor. In the case of a Little-endian storage format, the frame format of the stored data may be as shown in FIG. 4b.

Which sensors are used and which data formats are applicable are dependent on the algorithms the motion computing device uses in the subsequent process, and are not explained exhaustively in the present disclosure.

The communications module is adapted to transmit the motion data stored in the data storage module to the motion computing device. The transmission of motion data is mainly completed in two manners: one is to transmit data voluntarily; and the other one is to transmit data in response to request.

The aforesaid voluntary data transmission may include, but is not limited to, the following: 1) after one set of motion data is initially recognized and stored, the stored motion data is voluntarily transmitted to the motion computing device; 2) the motion data stored within the current period is voluntarily transmitted to the motion computing device periodically; and 3) the user initiates the transmission of the stored motion data to the motion computing device, for example, the user triggers the data acquisition device to transport the latest N1 set of motion data, wherein N1 is a preset positive integer.

In the case of data transmission in response to request, the motion computing device needs to send a request for collecting data to the data acquisition device. Upon request, the communications module of the data acquisition device transmits the requested motion data stored in the data storage module to the motion computing device. Flexibly, the motion computing device may request a certain range of motion data from the data acquisition device, for example, the latest N1 set of motion data, the oldest N2 set of motion data, etc, wherein N2 is a preset positive integer. Alternatively, the motion computing device may request all of the motion data that the data acquisition device has not yet shared therewith.

So far, the motion computing device is capable of motion recognition by analyzing and computing the motion data transmitted from the data acquisition device.

Embodiment 2 will be set forth below to explain in detail the motion detection by the initial motion recognition module.

Embodiment 2

In this embodiment, as is also explained above, the motion detection conducted by the initial motion recognition module involves the detection of a motion trigger point, and requires to transmit the m*Fs frames of data preceding the motion trigger point and the n*Fs frames of data after the motion trigger point (including the motion trigger point per se) to the data storage module for storage. Consequently, in this embodiment, a first buffer and a second buffer are employed to respectively store data frames preceding the detection of the motion trigger point, and data frames after the detection of the motion trigger point. Preferably, in order to maintain m*Fs frames of data preceding the motion trigger point in the data storage module and meanwhile occupy as few buffer resources as possible, the first buffer is sized to store m*Fs frames. The first buffer has a fixed size such that when the first buffer is full, the extra data frames that are continued to be written in will overwrite the oldest data frames. This design makes sure that once the motion trigger point is located, the first buffer will exactly store m*Fs frames of data. To increase operation efficiency, a circulating queue is designed in the first buffer, which maintains a write pointer always pointing to the address of the next write operation. Therefore, when the write pointer points to the last address of the buffer, the next write triggers the write pointer to point to the first address of the buffer. The second buffer used in this embodiment may simply be designed to use a sequential storage.

Figure 5:
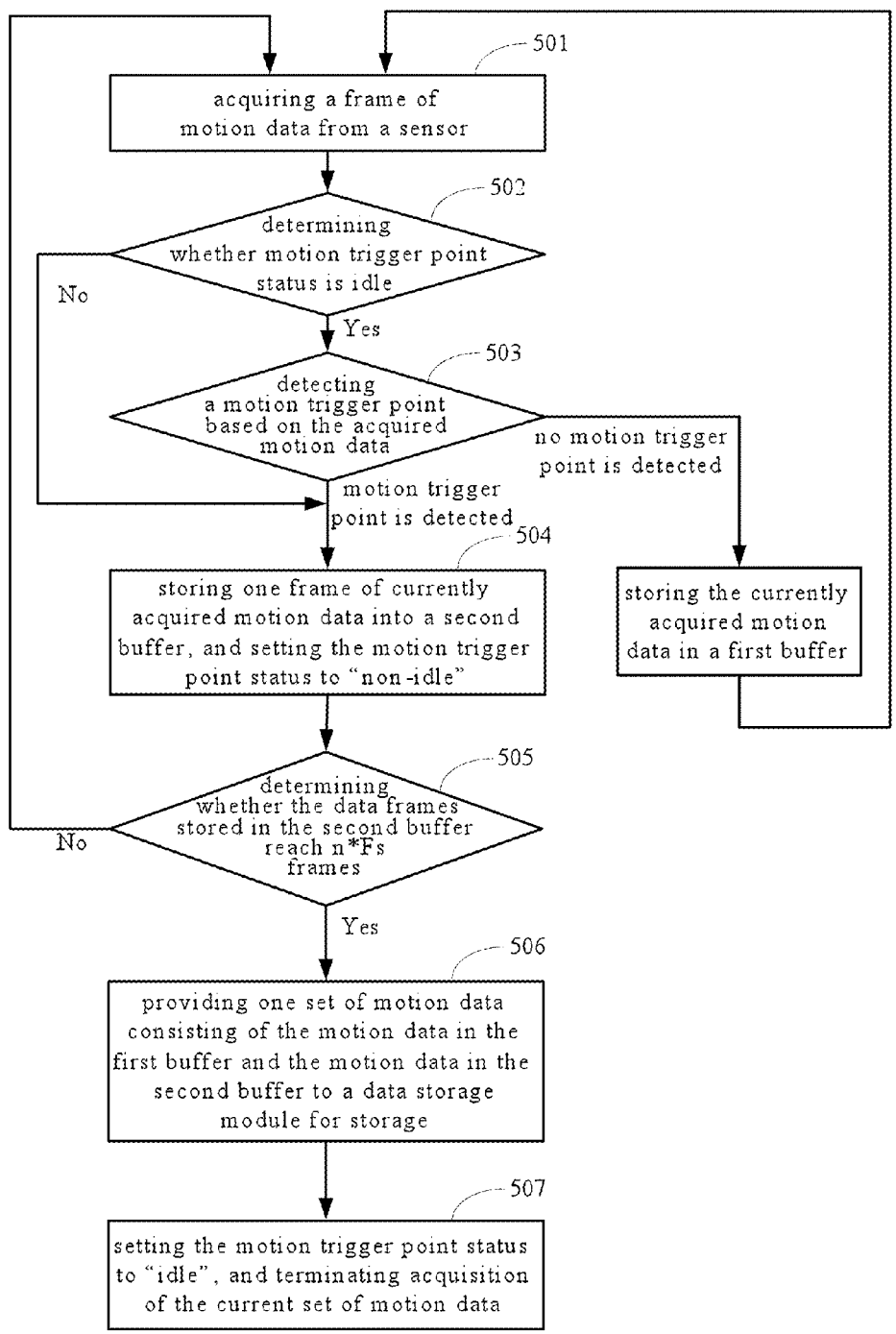
FIG. 5 shows a flow diagram of motion detection performed by an initial motion recognition module according to a second embodiment of the present disclosure.

The aforesaid data storage is mainly implemented as follows: the initial motion recognition module buffers the motion data transmitted from the sensor and conducts a motion trigger point detection. In particular, the m*Fs frames of data preceding the motion trigger point are stored in the first buffer, while the data frames starting from the motion trigger point are placed into the second buffer. When the second buffer maintains up to n*Fs frames of data, the entire set of motion data consisting of the m*Fs frames in the first buffer and the n*Fs frames in the second buffer is transmitted to and stored in the data storage module. Described below is a preferred embodiment for the aforesaid motion detection approach. FIG. 5 shows a flow diagram of motion detection performed by an initial motion recognition module according to a second embodiment of the present disclosure. The motion detection comprises the following steps:

At Step 501, a frame of motion data is acquired from a sensor.

At Step 502, it is determined whether a motion trigger point status is idle. If no, the process skips to Step 504; if yes, the process proceeds to Step 503.

Step 502 is intended to determine whether a motion trigger point occurs by determining whether the motion trigger point status is idle. The motion trigger point status is initially set to "Idle". Once the motion trigger point is detected, it is changed to "Non-idle". After completing the acquisition of one set of motion data, the status returns to "Idle".

Step 503 tries to detect the motion trigger point based on the acquired motion data. If the motion trigger point fails to be detected, the currently acquired motion data is placed into the first buffer, and then the process returns to Step 501 to acquire the next frame of motion data. If the motion trigger point is detected, the process proceeds to Step 504.

To be more specific, if the motion trigger point fails to be detected at Step 503, it is necessary to detect the motion trigger point with respect to each frame of motion data until the motion trigger point is eventually detected. The motion trigger point detection in this step comprises detection of stroke and a large-dimension motion. If a stroke or a large-dimension motion is detected, the motion trigger point is deemed to have been detected, and the motion trigger point status is set to "Non-idle". On the contrary, no motion trigger point is deemed to have been detected.

The occurrence of stroke is judged by determining whether a sudden change occurs to the acceleration or the angular speed at a certain point. The stroke may be detected using the following three methods.

The first method is to detect the stroke solely based on whether a sudden change occurs to the acceleration. In particular, it is determined whether the difference between the acceleration of the current frame of motion data and the acceleration of the last frame of motion data reaches a threshold value predefined for the sudden change in the acceleration. If the result is positive, a stroke is deemed to have occurred. During this determination, as the acceleration may be three-dimensional data obtained via a three-axis acceleration sensor, the aforesaid difference values to be determined may comprise the difference in ACC X between the current frame and the last frame, the difference in ACC Y between the current frame and the last frame, and the difference in ACC Z between the current frame and the last frame. If an M1 number of these difference values reach up to the threshold value predefined for the sudden change in the acceleration, a determination is then made that the difference between the acceleration of the current frame of motion data and the acceleration of the last frame of motion data reaches the threshold value predefined for the sudden change in the acceleration. Said "M1" is set to one, two or three.

The second method is to determine a stroke solely based on whether a sudden change occurs to the angular speed. In particular, it is determined whether the difference between the angular speed of the current frame of motion data and the angular speed of the last frame of motion data reaches a threshold value predefined for the sudden change in the angular speed. If the result is positive, a stroke is deemed to have occurred. During this determination, as the angular speed may be three-dimensional data obtained via a three-axis gyroscope, the aforesaid difference values to be determined comprise the difference in Gyro X between the current frame and the last frame, the difference in Gyro Y between the current frame and the last frame, and the difference in Gyro Z between the current frame and the last frame. If an M2 number of these difference values reach up to the threshold value predefined for the sudden change in the angular speed, a determination is made that the difference between the angular speed of the current frame of motion data and the angular speed of the last frame of motion data reaches the threshold value predefined for the sudden change in the angular speed. Said "M2" is set to one, two or three.

The third method is to determine a stroke based on whether a sudden change occurs to both the acceleration and the angular speed. In particular, it is determined whether the difference between the acceleration of the current frame of motion data and the acceleration of the last frame of motion data reaches a threshold value predefined for the sudden change in the acceleration, and meanwhile whether the difference between the angular speed of the current frame of motion data and the angular speed of the last frame of motion data reaches a threshold value predefined for the sudden change in the angular speed. If both results are found to be true, a stroke is deemed to have occurred. The determination with respect to the acceleration is the same as discussed above in the first method, and the determination with respect to the angular speed is the same as discussed above in the second method.

Among the supra three methods, the third one is preferred in that it is reliable in recognition and reduces error rate. In anyone of these three methods, the selection of M1 and M2 is, to some extent, dependent on the position of the data acquisition device. For example, if the data acquisition device is disposed on a glove, M1 and M2 may be set to a relatively large value, for example, two or three. If it is disposed on a club, which is more sensitive to the motion, M1 and M2 may be set to a smaller value, for example, one or two. In addition, the selection of M1 and D2 is also related to the particular types of sports to some extent.

For example, a stroke occurs when the golf club hits the golf ball. The impact, i.e., the moment when the golf club hits the golf ball, is the motion trigger point in the sense of the present disclosure. At the impact, the data acquisition device disposed on the golf club or glove acquires the current frame of motion data via a sensor. If both the difference in ACC X between the current frame and the last frame and the difference in ACC Y between the current frame and the last frame reach a threshold value predefined for the sudden change in the acceleration, and both the difference in Gyro X between the current frame and the last frame and the difference in Gyro Y between the current frame and the last frame reach a threshold value predefined for the sudden change in the angular speed, a stroke is deemed to have occurred at the current sampling moment, and a motion trigger point is detected in the current frame of motion data.

The large-dimension motion detection follows the principle that a large-dimension motion is deemed to have occurred if the acceleration of the current frame of motion data is large enough to reach a predefined threshold, and meanwhile the angular speed is also large enough to reach a predefined threshold. Considering a three-axis acceleration sensor and a three-axis angular speed sensor are often used, the acceleration and the angular speeds are usually determined by computing Mod of the three-axis acceleration vector and the three-axis angular speed. For example, if the acceleration is 6 times or more as large as the gravitational acceleration and meanwhile the angular speed is larger than 800 rad/s, a large-dimension motion is determined positive.

At Step 504, the currently acquired frame of motion data is stored in a second buffer, and the motion trigger point status is set to "Non-idle".

As the currently acquired frame of motion data is found to contain a motion trigger point, the subsequent frames of data starting from said current frame need to be placed into the second buffer.

It is then determined at Step 505 whether the number of frames stored in the second buffer reaches n*Fs. If it is negative, the process returns to Step 501 to acquire the next frame of motion data. If it is positive, the process proceeds to Step 506.

At Step 506, the motion data stored in the first buffer and the motion data stored in the second buffer, as a single set of motion data, are provided to and stored in the data storage module.

Once the number of frames of motion data stored in the second buffer reaches n*Fs, it means that one set of motion data has been collected. The motion data in the second buffer is then forwarded to the data storage module, such that the data storage module may store the acquired one set of motion data in a format as shown in FIG. 3.

The motion trigger point status is set to "Idle" at Step 507 to terminate the acquisition of the current set of motion data.

If it is necessary to collect the next set of motion data, the first and second buffers are cleared, and the motion trigger point status is initialized to start the process again from Step 501.

It can be seen from the aforesaid embodiments that the core of the data acquisition device provided in the present invention consists in the initial motion recognition module. Hereunder the structure of this initial motion recognition module is illustrated in detail by way of Embodiment 3.

Embodiment 3

Figure 6:
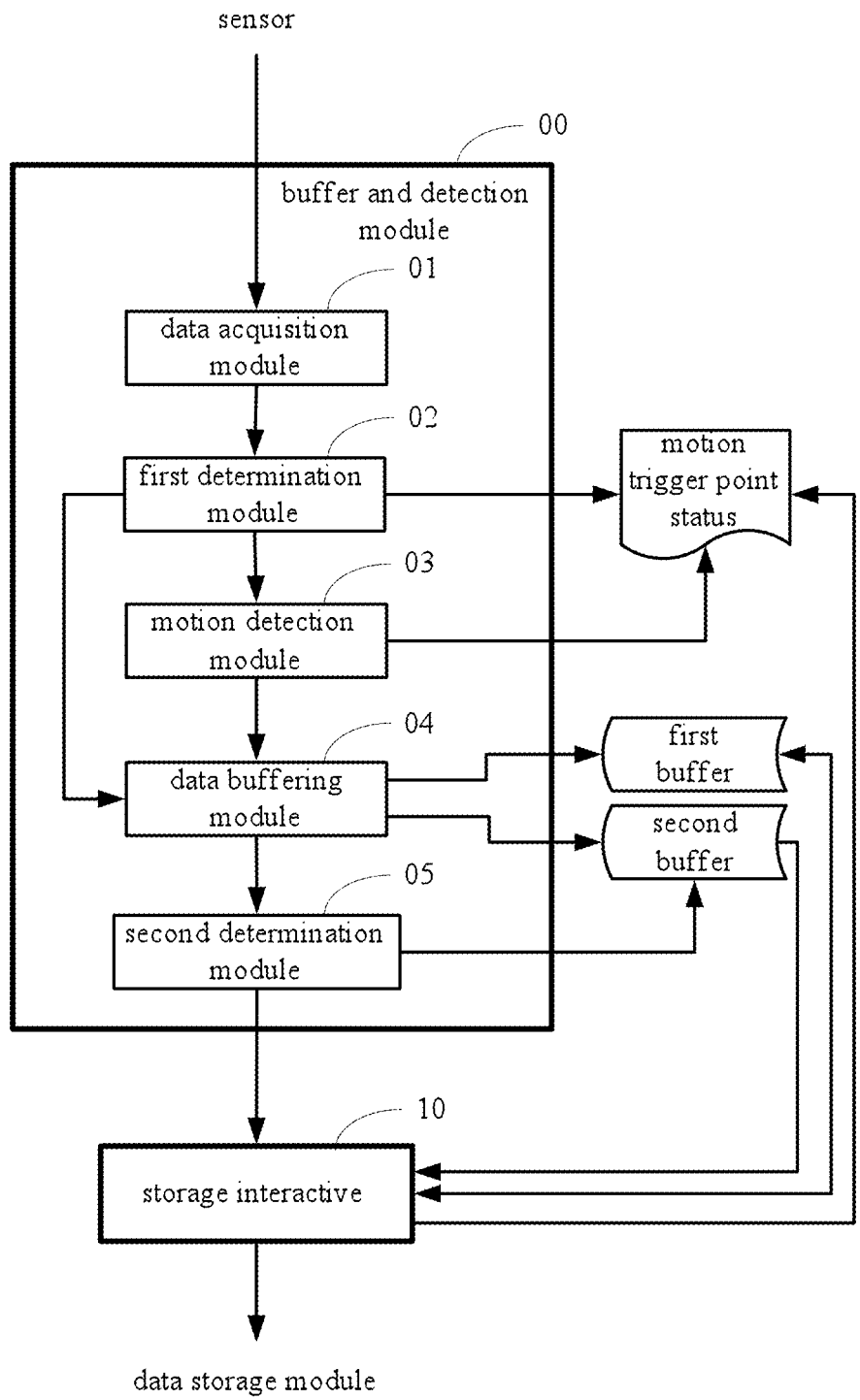
FIG. 6 shows a motion recognition module according to a third embodiment of the present disclosure.

FIG. 6 shows a motion recognition module according to a third embodiment of the present disclosure. As is shown, the motion recognition module mainly comprises a buffer and detection module 00 and a storage interactive module 10. The buffer and detection module 00 comprises: a data acquisition module 01, a first determination module 02, a motion detection module 03, a data buffering module 04 and a second determination module 05.

The buffer and detection module 00 buffers the motion data collected by the sensor and detects a motion trigger point. In particular, m*Fs frames of motion data prior to the motion trigger point are placed into the first buffer, and frames of motion data after the motion trigger point are placed into the second buffer. As is discussed in Embodiment 2 supra, to make sure that m*Fs frames of data will have been stored before the detection of the motion trigger point and meanwhile it takes up as few buffer resources as possible, it is preferred to size the first buffer to store m*Fs frames of data. The first buffer has a fixed size such that when the first buffer is full, the extra data frames that are continued to be written in will overwrite the oldest data frames. This design makes sure that once the motion trigger point is located, the first buffer will exactly store m*Fs frames of data. To increase operation efficiency, a circulating queue is designed in the first buffer, which maintains a write pointer always pointing to the address of the next write operation. Therefore, when the write pointer points to the last address of the buffer, the next write triggers the write pointer to point to the first address of the buffer. The second buffer used in this embodiment may simply be designed to use a sequential storage.

When the second buffer stores up to n*Fs frames of data, the storage interactive module 10 forwards the complete set of motion data consisting of the m*Fs frames in the first buffer and the n*Fs frames in the second buffer to the data storage module for storage.

The buffer and detection module 00 is set forth in greater details below. Continuing referring to FIG. 6, the data acquisition module 01 is adapted to acquire a frame of motion data from the sensor. Put it another way, the data acquisition module 01 receives, frame by frame, the motion data which the sensor collects at various sampling moments, and triggers the first determination module 01 to start operation.

The first determination module 02 determines whether the motion trigger point status is idle. If it is not idle, the first determination module 02 then triggers the data buffering module 04. If it is idle, the first determination module 02 then triggers the motion detection module 03. The motion trigger point in this embodiment is intended to identify whether a motion trigger point is detected in the current set of motion data. The initial status of the motion trigger point is set to "Idle", which means that no motion trigger point is detected. Once the motion trigger point is located, the motion trigger point status is set to "Non-idle", and reset to "Idle" after one set of motion data has been acquired.

Triggered by the first determination module 02, the motion detection module 03 detects the motion trigger point based on the current frame of motion data. If the motion detection module 03 does not detect a motion trigger point, it triggers the data buffering module 04. If the motion detection module 03 detects a motion trigger point, it sets the motion trigger point status to "Non-idle".

Particularly, the motion trigger point detection by the motion detection module 03 during the initial motion recognition comprises at least one of a stroke detection and a large-dimension motion detection. If the motion detection module 03 detects a stroke or a large-dimension motion, the motion trigger point is deemed to have been detected; otherwise, no motion trigger point is deemed to have been detected.

The stroke may be detected by determining one of the following:

(1) whether the difference between the acceleration of the current frame of motion data and the acceleration of the last frame of motion data reaches a threshold value predefined for the sudden change in the acceleration. If the result is positive, a stroke is deemed to have occurred.

(2) whether the difference between the angular speed of the current frame of motion data and the angular speed of the last frame of motion data reaches a threshold value predefined for the sudden change in the angular speed. If the result is positive, a stroke is deemed to have occurred.

(3) whether the difference between the acceleration of the current frame of motion data and the acceleration of the last frame of motion data reaches a threshold value predefined for the sudden change in the acceleration, and meanwhile whether the difference between the angular speed of the current frame of motion data and the angular speed of the last frame of motion data reaches a threshold value predefined for the sudden change in the angular speed. If both results are positive, a stroke is deemed to have occurred.

If one-dimensional acceleration and angular speed are collected, the particular computation can be readily appreciated. However, if a three-axis acceleration sensor is used to collect three-dimensional acceleration, the differences in Acc X, Acc Y and Acc Z between the current and the last frames of motion data are respectively determined. If a M1 number of difference values reaches up to the predefined threshold value for the sudden change in the acceleration, it is determined that the difference between the acceleration of the current frame of motion data and the acceleration of the last frame of motion data reaches a threshold value predefined for the sudden change in the acceleration. M1 may be set to one, two or three, and Acc X, Acc Y and Acc Z respectively represent the accelerations along X-, Y- and Z-axis collected by the three-axis acceleration sensor.

If a three-axis angular speed sensor is used to collect the angular speed, the differences in Gyro X, Gyro Y and Gyro Z between the current and the last frames of motion data are respectively determined. If a M2 number of difference values reaches up to the predefined threshold value for the sudden change in the angular speed, it is determined that the difference between the angular speed of the current frame of motion data and the angular speed of the last frame of motion data reaches a threshold value predefined for the sudden change in the angular speed. M2 may be set to one, two or three, and Gyro X, Gyro Y and Gyro Z respectively represent the angular speed around X-, Y- and Z-axis collected by the three-axis angular speed sensor.

Likewise, the aforesaid third method is the most preferred, because this method is more reliable in motion recognition and has a reduced error rate. In anyone of these three methods, the selection of M1 and M2 is, to some extent, dependent on the position of the data acquisition device. For example, if the data acquisition device is disposed on a glove, M1 and M2 may be set to a relatively large value, for example, two or three. If the data acquisition device is disposed on a club, which is more sensitive to motion, M1 and M2 may be set to a smaller value, for example, one or two. Besides, the selection of M1 and M2 is also dependent on the particular types of sports to some extent.

The large-dimension motion may be detected by determining whether the acceleration of the currently acquired frame of motion data is large enough to reach a predefined acceleration threshold, and meanwhile the angular speed is also large enough to reach a predefined angular speed threshold. If both results are positive, it is determined that a large-dimension motion has occurred. Considering a three-axis acceleration sensor and a three-axis angular speed sensor are often used, the acceleration and the angular speed are usually determined by computing Mod of the three-axis acceleration vector and the three-axis angular speed. For example, if the acceleration is 6 times or more as large as the gravitational acceleration and meanwhile the angular speed is larger than 800 rad/s, a large-dimension motion is determined positive.

When triggered by the motion detection module 03, the data buffering module 04 stores the currently obtained frame of motion data into a first buffer, whereas when triggered by the first determination module 02, the data buffering module 04 places the currently obtained frame of motion data into a second buffer and triggers the second determination module 05.

When triggered, the second determination module 05 determines whether the number of frames stored in the second buffer reaches up to n*Fs. If the number of frames stored in the second buffer reaches up to n*Fs, the storage interactive module 10 will forward the complete set of motion data consisting of the m*Fs frames in the first buffer and the n*Fs frames in the second buffer to the data storage module for storage. Upon completion of operation, the storage interactive module 10 initializes the motion trigger point status to "Idle".

Upon the processes discussed in the aforesaid embodiments, the motion computing device, given the motion data from the data acquisition device, will be able to perform motion recognition with respect to ball games such as, golf and badminton. The motion recognition may include, but is not limited to: 1) acquiring and storing one set of motion data by the motion computing device, i.e., receiving motion data from the data acquisition device. Usually, for collecting motion data of a ball game, the sensor disposed in the data acquisition device may comprise a three-axis acceleration sensor, a three-axis gyroscope, and a three-axis magnetic field sensor, and the motion data to be collected may comprise acceleration, angular speed, and attitude angle relative to a three-dimensional geomagnetic coordinate system. 2) Filtering noise. 3) Computing zero drift outputted by the sensor, and correcting the motion data acquired at different sampling moments. 4) Detecting a static motion based on accelerations measured at various sampling moments by determining a starting moment $t_0$ and a terminating moment $t_e$ of a motion. 5) Calculating actual accelerations at various sampling moments, i.e., estimating, from the postures, the accelerations at various sampling moments with the gravitational acceleration being removed. 6) Extracting feature points to recognize the motion type. Hereunder golf is taken as an example to illustrate identification of feature points after determining speeds, accelerations, positions and postures at various sampling moments based on the motion data:

Feature point 1: at Feature point 1, the speed is zero. It corresponds to static alignment at an initial time moment.

Feature point 2: this point is identified if the ratios of the speed at the horizontal dimension to the speeds at the other two dimensions both exceed a predefined ratio specific for Feature point 2. This point corresponds to takeaway of the backswing where the arm is almost horizontal.

Feature point 3: this point is identified if the ratios of the speed in a first direction at the vertical dimension to the speeds at the other two dimensions both exceed a predefined ratio specific for Feature point 3. This point corresponds to the halfway of the backswing where the club is swung to a direction almost vertical to the ground.

Feature point 4: this point is identified if the speed at the vertical dimension is smaller than a predefined threshold specific for Feature point 4, and, more preferably, meanwhile highness and acceleration both meet the requirements predefined for Feature point 4. This point corresponds to the top of the backswing where the speed at the vertical dimension is almost zero, and where highness and posture of the arm are both limited.

Feature point 5: this point is identified if the ratios of the speed in a second direction at the vertical dimension to the speeds at the other two dimensions both exceed a predefined ratio specific for Feature point 5. The second direction is opposite to the aforesaid first direction, and the ratios at Feature point 5 are larger than those at Feature point 3. This point corresponds to downswing to get ready for the stroke, which is similar to the halfway of backswing, but has a larger speed and an opposite direction.

Feature point 6: this point needs to be explained in two different situations. In the first situation, the golfer simply practices golf swing without hitting the golf ball; while in the second situation, the golfer hits the golf ball with the golf club. At the impact, the golf club hits the ball at a very high speed to cause a severe change to the acceleration.

In the aforesaid first situation, Feature point 6 is identified if $\min(\alpha\|X_t-X_{init}\|+\beta\|T_t-T_{init}\|)$ at the sampling moment t is smaller than a preset threshold value specific for Feature point 6. $X_t$ represents the position at the sampling moment t; $X_{init}$ represents the position at the initial moment $t_0$; $T_t$ represents the posture at the sampling moment t; and $T_{init}$ represents the posture at the initial moment $t_0$. $\alpha$ and $\beta$ are preset parameters, and $T_{init}$ and $T_t$ particularly represent the rotated posture of the object to be identified at the sampling moments $t_0$ and t respectively.

In the second situation, Feature point 6 is identified if a change rate of the acceleration at a certain moment exceeds a predefined threshold for the change rate of the acceleration specific for Feature point 6. This point corresponds to the stroke. More preferably, for golf swing, an obvious fluctuation will occur to the change rate of the angular speed at the impact. Therefore, it can be determined that there is a moment when the change rate of the acceleration exceeds a threshold change rate for the angular speed specifically preset for Feature point 6.

The motion types corresponding to the provided sets of motion data are eventually recognized, stored, outputted or displayed. Also stored, outputted or displayed include such motion parameters as the acceleration, speed, position and posture at various sampling moments. The motion recognition method used by the motion recognition device presented in the present invention is nothing but one of the methods as listed. The present disclosure is not limited to any recognition methods used by the motion recognition devices, and is not intended to list exhaustively all of the recognition methods. It would be also appreciated that the aforesaid particular recognition methods may be performed off-line.

From the embodiments provided in the present disclosure, it would be appreciated that the system, device and method as disclosed herein may be implemented in different manners. For example, the devices described supra are simply illustrative, and various modules as disclosed are simply divided according to respective logical functions, and may be configured differently in particular implementations. Furthermore, various functional modules included in various embodiments provided in the present disclosure may be integrated in a single processing module, or exist separately as a physical module. Alternatively, two or more of such functional modules are integrated in one module.

The aforesaid integrated modules which are implemented as functional software modules may be maintained in a computer readable storage medium, which comprises instructions that enable a computer device (e.g., a PC, server or a network device, etc) or a processor to execute part of the steps included in the methods throughout the embodiments of the present invention. This computer readable storage medium may comprise various mediums which can store program codes such as a U-disk, a mobile hard disk, Read-only Memory (ROM), a Random Access Memory (RAM), a diskette or disk.

The aforesaid should be construed as preferred embodiments for the implementation of the present invention, rather than limiting the scope of the present invention. Any equivalent variations, substitutions, and improvements to the present invention without departing from the spirit and principle of the present invention should be considered to fall into the scope of the present invention.

What we claim is:

1. A data acquisition method for motion recognition for use in a data acquisition device comprising an initial motion recognition module, a data storage module and a communications module, the method comprising:

Step S1) the initial motion recognition module performing an initial recognition with respect to motion data acquired by a sensor, and providing m*Fs frames of motion data prior to the motion trigger point, motion data regarding the motion trigger point, and n*Fs−1 frames of motion data after the motion trigger point to the data storage module for storage, m and n denoting a predefined positive integer, and Fs denoting a sampling rate, and wherein one frame of motion data is a collection of data collected by various sensors at the same sampling moment; and Step S2) the communications module forwarding the motion data stored at the data storage module to a motion computing device for motion recognition.

2. The method according to claim 1, wherein said Step S1) comprises:

Step S11) the initial motion recognition module storing the motion data acquired from the sensor and detecting a motion trigger point, wherein the m*Fs frames of motion data prior to the motion trigger point are stored in a first buffer, and frames of motion data starting from the motion trigger point are stored in a second buffer; and Step S12) providing one set of motion data consisting of the m*Fs frames in the first buffer and the n*Fs frames in the second buffer to the data storage module for storage when the second buffer contains up to n*Fs frames of data.

3. The method according to claim 2, wherein said Step S11 comprises:

Step S111) the initial motion recognition module acquiring a frame of motion data from a sensor;

Step S112) determining whether a motion trigger point status is idle, and performing Step S114) if the motion trigger point status is not idle or performing Step S113) if the motion trigger point status is idle;

Step S113) detecting a motion trigger point with respect to the current frame of motion data, and, if no motion trigger point is detected, storing the current frame of motion data in the first buffer and returning to Step S111) to acquire a next frame of motion data; if motion trigger point is detected, setting the motion trigger point status to non-idle and performing Step 114);

Step S114) storing the current frame of motion data into the second buffer; and

Step S115) determining whether the second buffer contains up to n*Fs frames of data, and, if negative, returning to Step 111) to acquire a next frame of motion data; if positive, performing said Step S12), wherein the motion trigger point status is initially set to idle, and is initialized to idle after executing said Step S12).

4. The method according to claim 2, wherein the first buffer is sized to store m*Fs frames, and uses a circulating queue.

5. The method according to claim 1, wherein motion trigger point detection in the process of initial recognition comprises at least one of a stroke detection and a large-dimension motion detection; and wherein if a stroke or a large-dimension motion is detected, a motion trigger point is determined to have occurred; if no stroke or large-dimension motion is detected, no motion trigger point is determined to have occurred.

6. The method according to claim 5, wherein the stroke is detected by determining one of the following:

1): whether the difference between an acceleration of the current frame of motion data and an acceleration of the last frame of motion data reaches a threshold value predefined for a sudden change in the acceleration; if positive, a stroke is deemed to have occurred, 2) whether the difference between an angular speed of the current frame of motion data and the angular speed of the last frame of motion data reaches a threshold value predefined for a sudden change in the angular speed; if positive, a stroke is deemed to have occurred; and 3) whether the difference between an acceleration of the current frame of motion data and an acceleration of the last frame of motion data reaches a threshold value predefined for a sudden change in the acceleration, and meanwhile whether the difference between an angular speed of the current frame of motion data and an angular speed of the last frame of motion data reaches a threshold value predefined for a sudden change in the angular speed; if positive, a stroke is deemed to have occurred.

7. The method according to claim 5, wherein the large-dimension motion detection comprises:

determining whether the acceleration of the current frame of motion data is large enough to reach a predefined threshold, and meanwhile the angular speed is also large enough to reach a predefined threshold, and if positive, a large-dimension motion is determined to have occurred.

8. The method according to claim 1, wherein said Step S2) comprises:

the communications module voluntarily forwarding the motion data stored in the data storage module to the motion computing device after completion of initial recognition and storage of one set of motion data or periodically or in response to a user trigger, or the communications module forwarding one or more sets of motion data requested by the motion computing device to the motion computing device in response to a request from the motion computing device.

9. A data acquisition device for motion recognition, comprising:

an initial motion recognition module adapted to perform an initial recognition with respect to motion data collected by a sensor and provide m*Fs frames of motion data prior to the motion trigger point, motion data regarding the motion trigger point, and n*Fs−1 frames of motion data after the motion trigger point to a data storage module for storage, m and n denoting a predefined positive integer, and Fs denoting a sampling rate, and wherein one frame of motion data is a collection of data collected by various sensors at the same sampling moment;

a data storage module adapted to store motion data provided from the initial motion recognition module; and a communications module adapted to transmit the motion data stored in the data storage module to a motion computing device for motion recognition.

10. The device according to claim 9, wherein the initial motion recognition module comprises:

a buffer and detection module adapted to store the motion data acquired from the sensor and detect a motion trigger point, wherein the m*Fs frames of motion data prior to the motion trigger point are stored in a first buffer, while frames of motion data starting from the motion trigger point are stored in a second buffer; and a storage interactive module adapted to, when the second buffer contains up to n*Fs frames of data, provide one set of motion data consisting of the m*Fs frames in the first buffer and the n*Fs frames in the second buffer to the data storage module for storage.

11. The device according to claim 10, wherein the buffer and storage module comprises:

a data acquisition module adapted to acquire a frame of motion data from a sensor;

a first determination module adapted to determine whether a motion trigger point status is idle, and trigger a data buffering module if the motion trigger point status is not idle or trigger a motion detection module if the motion trigger point status is idle;

a motion detection module adapted to, when triggered by the first determination module, detect a motion trigger point with respect to the current frame of motion data and, if no motion trigger point is detected, trigger a data buffering module; if motion trigger point is detected, set the motion trigger point status to non-idle;

a data buffering module adapted to, when triggered by the motion detection module, store the current frame of motion data into the first buffer, and when triggered by the first determination module, store the current frame of motion data into the second buffer and trigger a second determination module; and a second determination module adapted to, when triggered, determine whether the second buffer contains up to n*Fs frames of data, wherein the motion trigger point status is initialized to idle after the storage interactive module completes operations.

12. The device according to claim 10, wherein the first buffer is sized to store m*Fs frames, and uses a circulating queue.

13. The device according to claim 9, wherein motion trigger point detection performed by the initial motion recognition module in the process of initial recognition comprises at least one of a stroke detection and a large-dimension motion detection; and wherein if a stroke or a large-dimension motion is detected, a motion trigger point is determined to have occurred; if no stroke or large-dimension motion is detected, no motion trigger point is determined to have occurred.

14. The device according to claim 13, wherein the stroke is detected by determining one of the following:

1): whether the difference between an acceleration of the current frame of motion data and an acceleration of the last frame of motion data reaches a threshold value predefined for a sudden change in the acceleration; if positive, a stroke is deemed to have occurred, 2) whether the difference between an angular speed of the current frame of motion data and the angular speed of the last frame of motion data reaches a threshold value predefined for a sudden change in the angular speed; if positive, a stroke is deemed to have occurred; and 3) whether the difference between an acceleration of the current frame of motion data and an acceleration of the last frame of motion data reaches a threshold value predefined for a sudden change in the acceleration, and meanwhile whether the difference between an angular speed of the current frame of motion data and an angular speed of the last frame of motion data reaches a threshold value predefined for a sudden change in the angular speed; if positive, a stroke is deemed to have occurred.

15. The device according to claim 13, wherein the initial motion recognition module detects occurrence of a large-dimension motion by determining:

whether the acceleration of the current frame of motion data is large enough to reach a predefined threshold, and meanwhile the angular speed is also large enough to reach a predefined threshold, and if positive, determines that a large-dimension motion has occurred.

16. The device according to claim 9, wherein the communications module voluntarily forwards the motion data stored in the data storage module to the motion computing device after completion of initial recognition and storage of one set of motion data or periodically or in response to a user trigger; or the communications module forwards one or more sets of motion data requested by the motion computing device to the motion computing device in response to a request from the motion computing device.

17. A motion recognition system, comprising:
a motion computing device; and
a data acquisition device according to claim 9,
wherein the motion computing device is adapted to perform motion recognition based on motion data transmitted from the data acquisition device.

18. A computer readable storage medium, which stores programs for executing the method according to claim 1.

* * * * *